United States Patent [19]

van der Lely et al.

[11] Patent Number: 4,561,595
[45] Date of Patent: Dec. 31, 1985

[54] DEVICE FOR SPREADING GRANULAR AND/OR POWDERY MATERIAL

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 495,338

[22] PCT Filed: Mar. 8, 1983

[86] PCT No.: PCT/NL83/00009
§ 371 Date: Apr. 28, 1983
§ 102(e) Date: Apr. 28, 1983

[30] Foreign Application Priority Data

Mar. 9, 1982 [NL] Netherlands .......................... 8200958

[51] Int. Cl.$^4$ ............................................. A01C 17/00
[52] U.S. Cl. ...................................... 239/687; 239/676
[58] Field of Search ............... 239/687, 676, 681, 682, 239/650; 222/505, 506, 560

[56] References Cited

U.S. PATENT DOCUMENTS

| | | | |
|---|---|---|---|
| 3,204,644 | 9/1965 | McDougall-Kaley | 222/560 X |
| 3,420,452 | 1/1969 | Vaughan | 239/687 X |

FOREIGN PATENT DOCUMENTS

| | | | |
|---|---|---|---|
| 2410427 | 8/1979 | France | 239/676 |
| 589560 | 6/1947 | United Kingdom | 239/682 |
| 1310637 | 3/1973 | United Kingdom | . |
| 2010653 | 7/1979 | United Kingdom | 239/682 |
| 2019705 | 11/1979 | United Kingdom | . |
| 2080662 | 2/1982 | United Kingdom | 239/676 |

*Primary Examiner*—Jeffrey V. Nase
*Assistant Examiner*—Daniel R. Edelbrock
*Attorney, Agent, or Firm*—Penrose Lucas Albright

[57] ABSTRACT

A spreader has a hopper the lower region of which comprises a wall portion which coincides in part with a sphere and contains outlet ports for material to pass at an inclined angle from the hopper to a rotating distribution member. The free aperture of each port is adjustable by a dosing slide. These dosing slides are controlled by an adjusting mechanism capable of displacing either one of the dosing slides without displacing the other.

6 Claims, 12 Drawing Figures

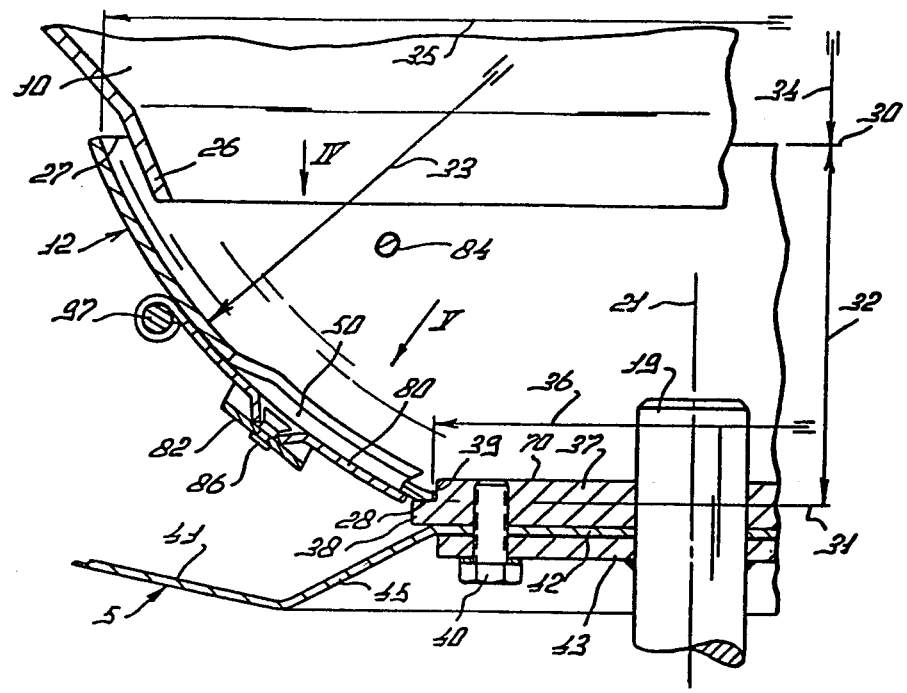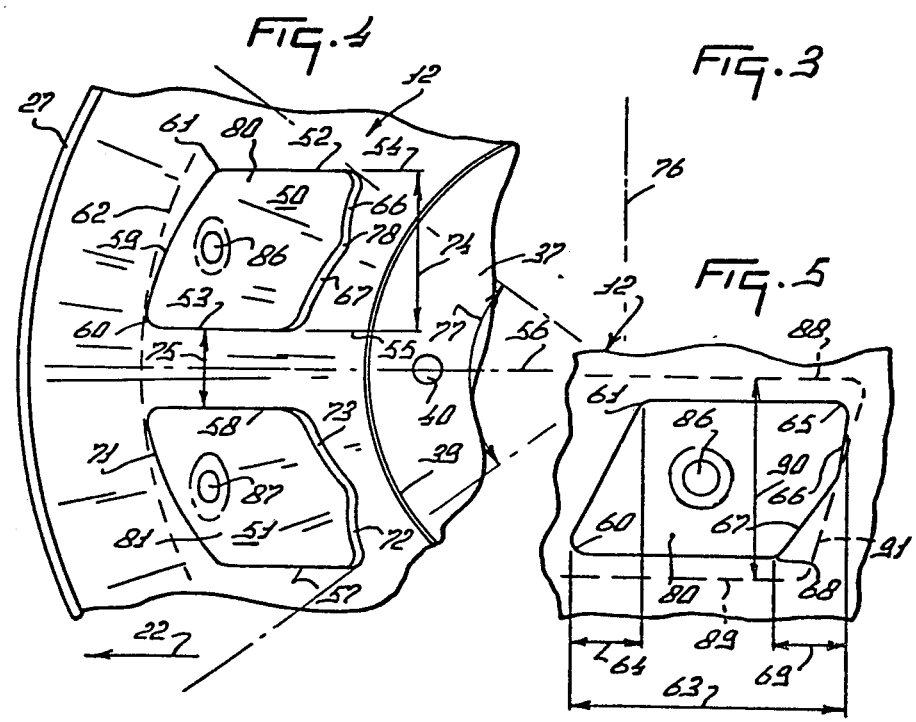

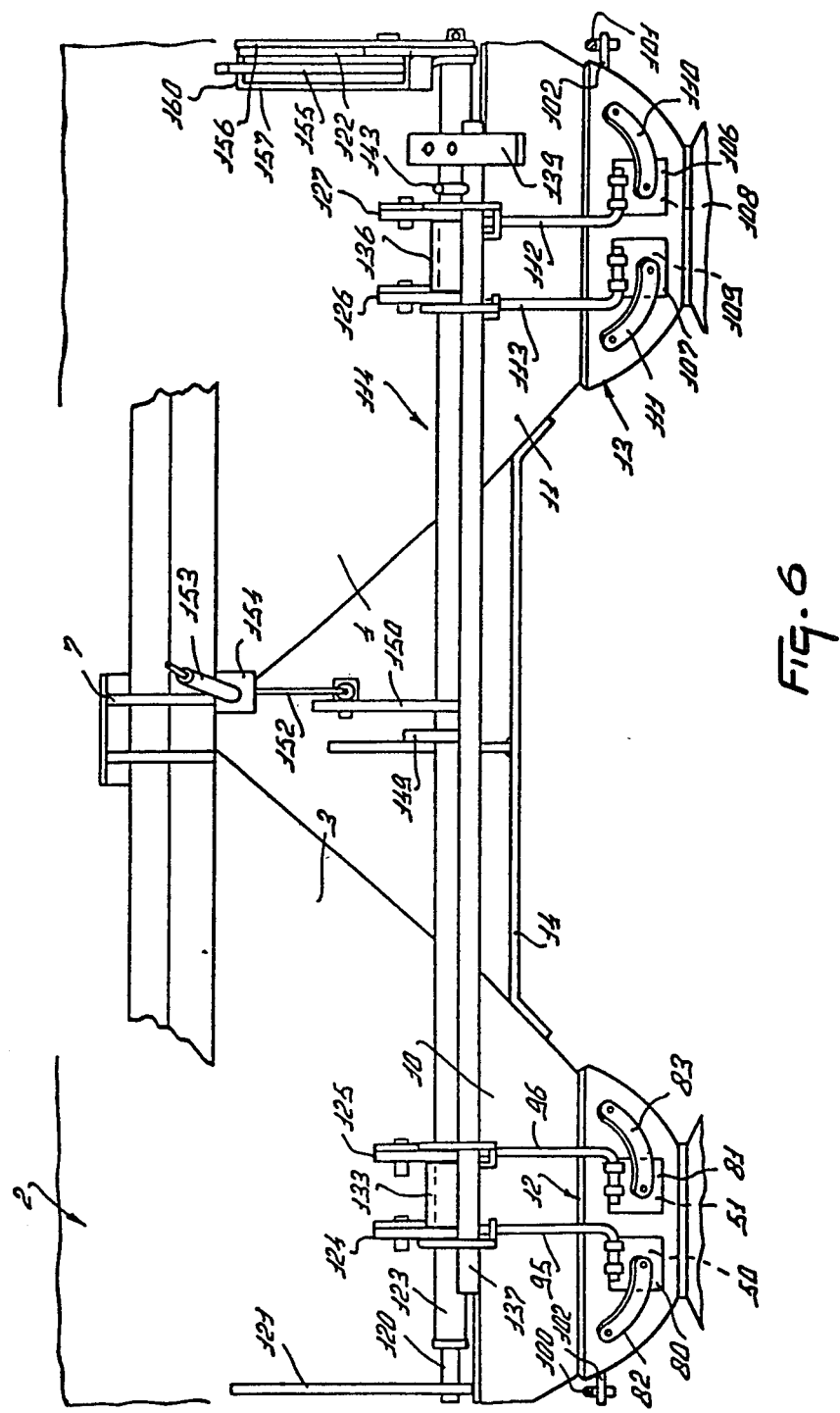

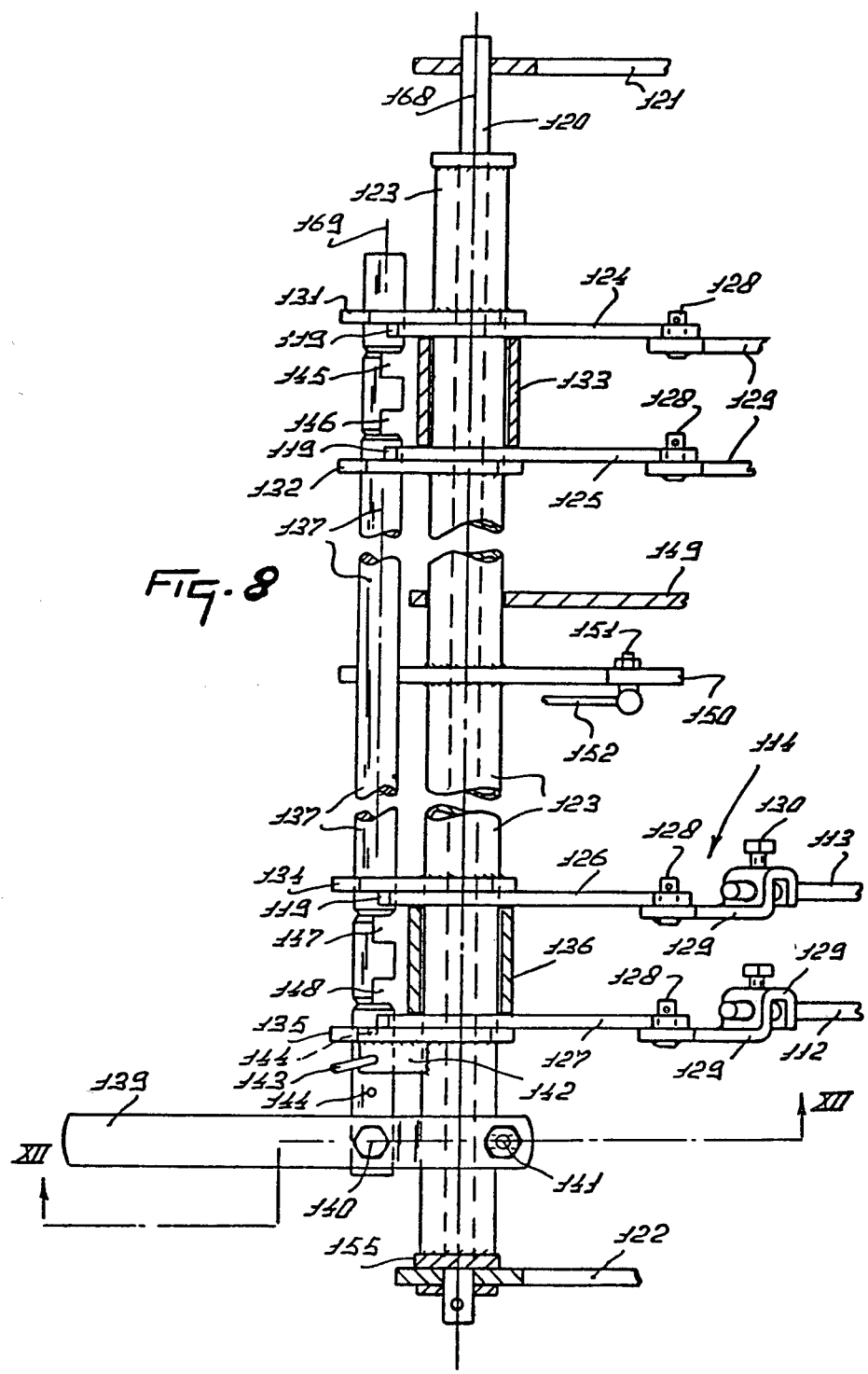

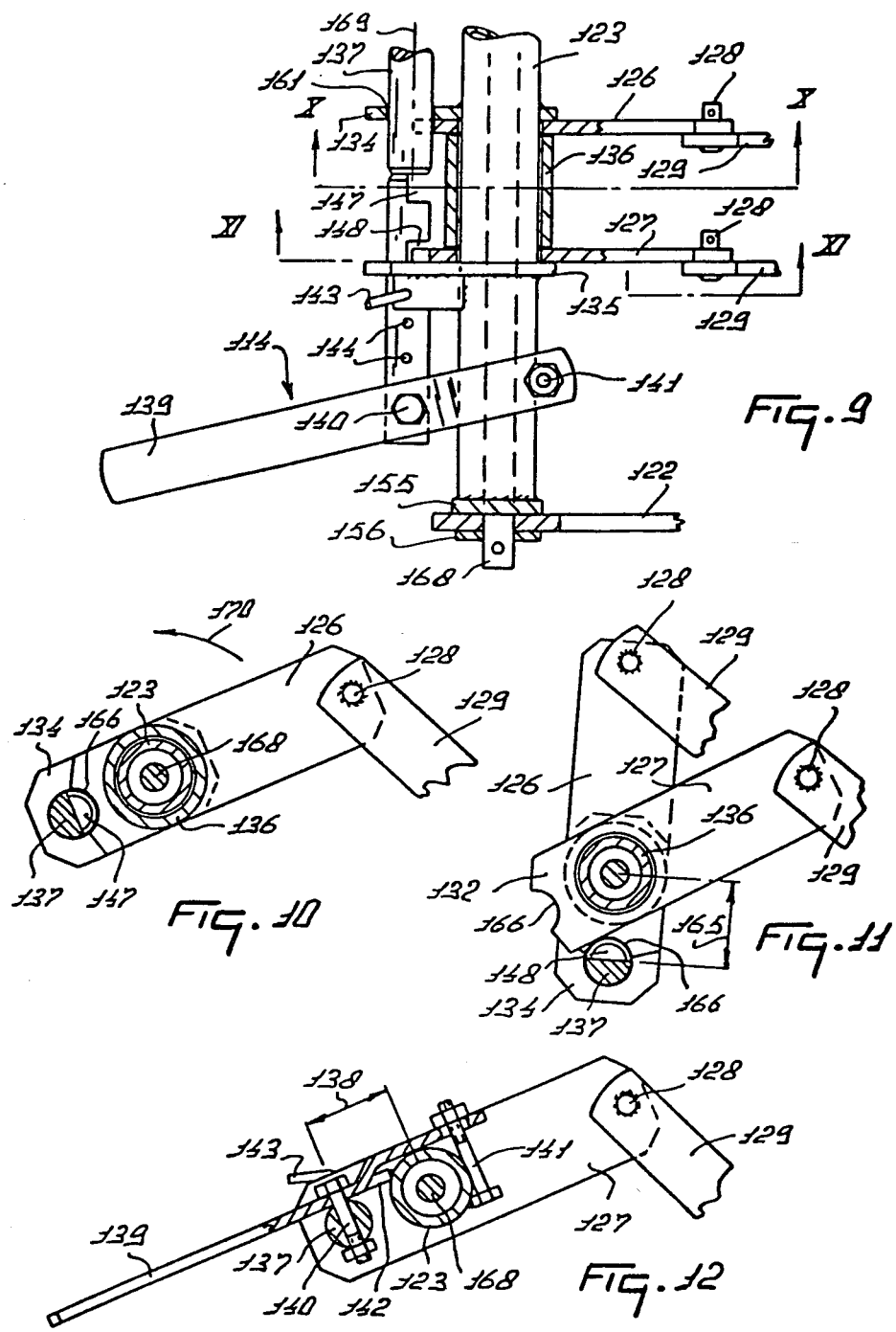

DEVICE FOR SPREADING GRANULAR AND/OR POWDERY MATERIAL

SUMMARY OF THE INVENTION

This invention relates to a device for spreading granular or powdery material or both, such as fertilizer.

Such devices, referred to as "spreaders" in this description, generally comprise a hopper for the material to be spread and at least one distribution member. The hopper has at least an outlet port through which the material can pass from the hopper to the distribution member.

According to one aspect of the present invention there is provided a device for spreading granular or powdery material or both comprising a hopper, for receiving the material to be spread, and a distribution member, the hopper having an outlet port through which the material can pass from the hopper to the distribution member, the outlet port being provided in a substantially part-spherical wall portion of the hopper.

In a spreader in accordance with the present invention, the space within the hopper near the outlet port is shaped so that the material can flow effectively towards the outlet port.

A simple embodiment is obtained when the part-spherical wall portion is annular and extends around 360°. The flow of material towards the outlet port is promoted when, in a horizontal position of the spreader, the center of curvature of the part-spherical wall portion is at a higher level than the part-spherical wall portion itself. Thus the hopper is narrowed near the part-spherical wall portion in a manner such that the material will not stick in the lower part of the hopper.

It is advantageous when the part-spherical wall portion adjoins the hopper's floor which is movable about an axis. The junction between the part-spherical wall portion and the floor can thus have a smooth shape so that the material can flow smoothly towards and through the outlet port. The outflow of the material is particularly favorably affected when the floor rotates about the axis during operation of the spreader. The rotating floor portion thus acts upon the flow of material moving towards the outlet port. The construction of the spreader is simplified if the rotary axis of the floor coincides with the axis on which the part-spherical wall portion is centered. A satisfactory junction between the part-spherical wall portion with the floor is obtained when the part-spherical wall portion bears at least partly on a circumferential shoulder of the hopper floor.

In a preferred embodiment of the spreader, the lower edge of the outlet port is located substantially at the level of the hopper floor. Thus the cooperation between the rotating floor and the outlet port can be utilized to the optimum. In a construction in which the hopper has two outlet ports, the lower and upper edges of the outlet ports extend downwardly in opposite senses. Therefore, even in the case of an outflow of small amounts of material from the hopper to the distribution member the material can be effectively fed to the distribution member for uniform distribution across a broad strip of land during operation.

The passage of material through the outlet ports can be readily controlled by providing a dosing slide adjacent the part-spherical wall portion for closing each outlet port to a greater or lesser extent, the dosing slide having a part-spherical shape and abutting the part-spherical wall portion. The dosing slide can be readily moved with respect to the part-spherical wall portion irrespective of the position of the dosing slide relative to the wall portion.

According to a second aspect of the present invention there is provided a device for spreading granular or powdery material or both comprising a hopper having at least two outlet ports, near each one of which is arranged a dosing slide for closing the outlet ports optionally to a greater or lesser extent, the dosing slides being movable independently of each other by an adjusting mechanism comprising a control member, a coupling mechanism being provided which is operable selectively to connect and disconnect one or both dosing slides to and from the control member so that one of the slides can remain in a predetermined position while the other slide is displaceable by the adjusting mechanism.

With such a construction, the mode of distribution can be determined in a simple manner, there being only one control member for adjusting the setting of the dosing slides.

A simple construction is obtained when the adjusting mechanism comprises a coupling member about which coupling arms connected with the dosing slides are rotatable, these coupling arms extending to positions near a coupling mechanism which is adjustable with respect to the coupling member, the coupling mechanism together with the coupling member being rotatable about the center-line of the coupling member. The coupling mechanism is adjustable in a manner such that the coupling arms can be optionally coupled by the coupling mechanism for rotation with the coupling member.

For a better understanding of the present invention and to show more clearly how it may be carried into effect, reference will now be made, by way of example, to the accompanying drawings, in which

BRIEF DESCRIPTION OF THE DRAWINGS

FIG. 3 is a further enlarged sectional view taken on the line III—III in FIG. 2;

FIG. 4 is a view taken in the direction of the arrow IV in FIG. 3;

FIG. 5 is a view taken in the direction of the arrow V in FIG. 3;

FIG. 6 is an enlarged, partial front view of the spreader, illustrating an adjusting mechanism;

FIG. 8 is a view on an enlarged scale, of part of the adjusting mechanism taken on the line VIII—VIII in FIG. 7;

FIG. 9 is a fragmentary view corresponding to FIG. 8, but showing the adjusting mechanism in a different position;

FIG. 10 is a sectional view taken on the line X—X in FIG. 9;

FIG. 11 corresponds to FIG. 10 but shows the adjusting mechanism in a different position; and FIG. 12 is a sectional view taken on the line XII—XII in FIG. 8.

DESCRIPTION OF THE PREFERRED EMBODIMENT

Figure 1:
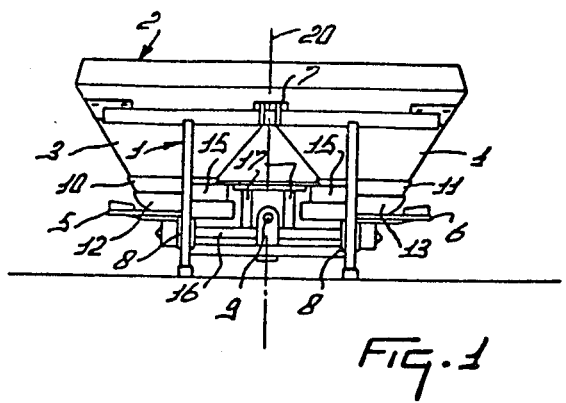
FIG. 1 is a schematic front view on a reduced scale of a spreader.

The spreader represented in the Figures comprises a frame 1 on which a hopper 2 is mounted. The hopper 2 has two funnel-shaped parts 3 and 4, below each of which there is a distribution member 5, 6. The frame 1 is provided with coupling lugs 7 and 8 for hitching the spreader to a three-point lifting device of a tractor or similar vehicle.

The distribution members 5 and 6 are coupled with a driving mechanism which is not shown in detail but has an input shaft 9 which can be coupled to the power take-off shaft of the tractor. The funnel-shaped hopper parts 3 and 4 are provided at their lower regions with delivery funnels 10 and 11 respectively which open into delivery basins 12 and 13. The delivery basins 12 and 13 constitute the lower wall portions of the hopper and are shaped as annular part-spherical members.

The delivery funnels 10 and 11 are intercoupled by a coupling strip 14, which is supported in a manner not shown by frame beams 15. Transmission means for the distribution members 5 and 6 is accommodated in a hollow beam 16, which is fastened by support strips 17 to the coupling strip 14. The hollow beam 16 is provided at its ends with gear boxes 18 in which are journalled shafts 19 on which the distribution members 5 and 6 are mounted. The frame 1, the hopper 2 and hence the delivery funnels 10 and 11 with the delivery basins 12 and 13 are disposed symmetrically about a plane 20 containing the longitudinal center-line of the spreader and extending in the normal intended direction of travel 22 of the spreader. The distribution members 5 and 6 are also disposed symmetrically about the plane 20; they are, however, relatively off-set about their rotary axes, in a manner which is not shown in detail.

The delivery basins 12 and 13 are identical anf for this reason only the delivery basin 12 is shown in FIGS. 2 to 5. The delivery basin 12 constitutes a broad part-spherical annulus having a top edge 27 and a bottom edge 28, which are parallel to each other. The edges 27 and 28 thus lie in parallel planes 30 and 31, between which the annulus comprises, so to speak, a section of a sphere so that the delivery basin constitutes a spherical wall portion near the underside of the hopper. The planes 30 and 31 going through the top and bottom edges 27 and 28 are perpendicular to an axis 21 on which lies the center of the sphere, so that the annular wall portion 12 is centered on the axis 21. The axis 21 coincides in this embodiment with the rotary axis of the distribution member 5. The top edge 27 of the spherical wall portion 12 surrounds the lower end 26 of the delivery funnel 11, which is centered on the rotary axis 21, the funnel being otherwise four-sided and adjoining the four-sided part 3 of the hopper 2. The spherical wall portion 12 has a height 32, which preferably exceeds one third of the radius of curvature 33 of the spherical wall portion 12 and in this embodiment is approximately equal to half the radius 33. The section of the imaginary sphere which constitutes the wall portion 12 is such that the distance 34 of the plane 30 from the center of curvature slightly exceeds half the distance 32 and is preferably approximately equal to one third of the radius 33. The upper edge 27 of the wall portion 12 has a diameter 35, which is not significantly smaller than twice the radius 33 and exceeds twice the diameter 36 of the lower edge 28. The size of the wall portion 12 is preferably chosen to be such that the diameter 35 is about thirty centimeters and the diameter 36 about thirteen centimeters.

The delivery basin 12 surrounds, with ample clearnace, the lower edge region 26 of the delivery funnel 10, and is movable with respect to the delivery funnel 10. The delivery basin 12 bears on the floor 37 of the hopper portion 3. The floor 37 has a radial flange 38 which supports the lower edge 28 of the delivery basin 12. The periphery of the floor 37 has a centering shoulder 39 which fits within the diameter 36 of the lower edge 28 of the delivery basin 12 in a manner such that the floor 37 and the delivery basin 12 are readily movable relative to one another about the centering shoulder 39. The floor 37 is rigidly secured by bolts 40 to the distribution member 5. The floor 37 is fastened to a raised, flat central portion 42 of a support plate 41 of the distribution member 5, on which ejection blades 44 are mounted. The floor 37 and the support plate 41 are fastened to a fastening plate 43, which is rigidly secured to the shaft 19. The shaft 19 extends in this embodiment through an opening in the central portion 42 and through an opening in the floor 37 and extends into the lower region of the hopper portion 3. From the portion 42, the support plate 41 has a downwardly extending, conical portion 45 which merges into a slightly upwardly extending, conical part 46, on which the blades 44 are mounted.

The delivery basin 12 has two outlet ports 50 and 51, which are mirror images of each other. The outlet port 50 has two opposite, upwardly extending edges 52 and 53 which are parallel to each other and lie in planes 54 and 55, which are parallel to a plane 56 containing the rotary axis 21 and extending in the direction 22. The plane 56 is parallel to the plane 20. The outlet port 51 has edges 57 and 58 which correspond to the sides 52 and 53 and are also parallel to the plane 56. The outlet port 50 has an upper edge 59, meeting the edge 53 at a point 60 which is higher than the point 61 at which it meets the edge 52. The higher point 60 is located on an imaginary circle 62, which is parallel to the top edge 27 and surrounds the axis 21 approximately midway between the planes 30 and 31.

As measured in the plane of FIG. 5, the outlet port 50 has an overall height 63, the point 60 lying at a distance 64 above the point 61, this distance 64 being about one quarter of the overall height 63. The lowermost point 65 of the outlet port 50 is located where the lower edge of the port meets the edge 52. The lower edge of the outlet port comprises two portions 66 and 67 which are inclined to each other, the portion 67 being slightly longer than the portion 66. The portion 67 meets the edge 53 at a point 68 which is a distance 69 above the point 65, this distance 69 also being approximately one quarter of the overall height 63 of the outlet port. The lower edge of the outlet port formed by the portions 66 and 67 is located substantially at the level of the top surface 70 of the floor 37.

The outlet port 51 has an upper edge 71 and a lower edge comprising two portions 72 and 73 in a manner such that the outlet ports 50 and 51 are disposed symmetrically about a plane extending parallel to the edges 52, 53 and 57, 58 and located midway between the edges 53 and 58. Normally the outlet ports 50 and 51 are located one on each side of the plane 56. The outlet port 51, which is nearer the plane of symmetry 20 than the outlet port 50, is located nearer the plane 56 than the outlet port 50. The outlet ports 50 and 51 are located at the front of the delivery basin 12, with respect to the travel direction 22.

The delivery basin 13 has a shape similar to that of the basin 12 and the basins 12 and 13 are disposed symmetrically about the plane 20. Like the delivery basin 12 the delivery basin 13 has two outlet ports located at the front of said basin. The outlet ports in the two delivery basins 12 and 13 are located in front of a plane 76 containing the rotary axes 21 of the two distribution members 5 and 6, this plane being perpendicular to the plane of symmetry 20.

The width 74 of the outlet port 50, measured between the edges 52 and 53, is substantially equal to one quarter of the radius of the curvature of the delivery basin 12. The outlet ports 50 and 51 are spaced apart by a distance 75, which is substantially half the distance 74. The outlet ports cover an angle 77 of about 75° around the axis 21.

Dosing slides 80 and 81 are arranged on the outer periphery surface of the delivery basin 12 near the ports 50 and 51 in a manner such that these ports can be closed optionally to a greater or lesser extent by the dosing slides 80 and 81. The dosing slides 80 and 81 are arranged on carrying arms 82 and 83, which are pivotally connected to the delivery basin 12 by pins 84 and 85. The carrying arms 82 and 83 are pivotally coupled to the dosing slides 80 and 81 by pins 86 and 87. The axes of the pins 84, 85 and 86, 87 extend through the center of the spherical wall portion 12. The dosing slides 80 and 81, like the outlet ports 50 and 51, are disposed symmetrically about a plane between them, as are the arms 82 and 83. The carrying arms 82 and 83 are made from resilient material and their cooperation with the pins 84, 86 and 85, 87 is such that they press the dosing slides 80 and 81 against the outer periphery of the delivery basin 12.

Each of the dosing slides, as is only shown for dosing slide 80, has two straight, opposite edges 88 and 89 extending parallel to the edges 52 and 53. The edges 88 and 89 are spaced apart by a distance 90, which slightly exceeds the distance 74. The slide 80 has a lower edge 91 which is slightly inclined to the horizontal so that the lowermost point of this lower edge 91 is located on the side where the lowermost point 65 of the lower edge of the outlet port 50 is located.

The delivery basins 12 and 13 surround with clearance the lower ends 26 of the respective delivery spouts 10 and 11 and are prevented from turning about the delivery parts 10 and 11 by fixing arms 100 and 101. The ends of the arms 100 and 101 are bent through 90°, one end of each arm engaging a tongue 102 of the respective delivery basin. The other end 103 of each arm can be inserted at will into one of a plurality of holes 104 in a strip 105 secured to the frame 1.

Coupling rods 95 and 96 are pivotally connected to the top edges of the dosing slides 80 and 81 by pivotal shafts 97 and 98 respectively which comprise bent-over end portions of the coupling rods 95 and 96. The shafts 97 and 98 are parallel to the top edge 27 of the delivery basin. Dosing slides 106 and 107 corresponding with the dosing slides 80 and 81 for ports 108 and 109 corresponding with the outlet ports 50 and 51 in the delivery basin 13 are supported by carrying arms 110 and 111. The dosing slides 106 and 107 are coupled with coupling rods 112 and 113 corresponding with the coupling rods 95 and 96. The coupling rods 95, 96, 112 and 113 form part of an adjusting mechanism 114, for the dosing slides 80, 81, 106 and 107.

The adjusting mechanism 114 comprises a carrying spindle 120, which is secured by supports 121 and 122 to the front of the hopper, with respect to the travel direction 22. A hollow coupling tube 123 is supported on the spindle 120 and is rotatable about it. The coupling tube 123 extends over almost the whole length of the spindle 120 between the supports 121 and 122. Coupling arms 124, 125, 126 and 127 are mounted on the coupling tube 123 and are linked to the coupling rods 95, 96, 113 and 112 respectively by adjusting elements 129 which are connected to the coupling arms 124, 125, 126 and 127 by pivotal shafts 128. The adjusting elements 129 are clamped to the coupling rods 95, 96, 112 and 113 by screws 130 in a manner such that the distance between the pivotal shafts 128 and the respective pivotal shafts such as the pivotal shafts 97 and 98 of the coupling rods on the dosing slides is adjustable. The coupling rods 124 and 127 are rotatable about the coupling tube 123. The coupling arms 124 and 125 are arranged between locating strips 131 and 132 which are rigidly secured to the coupling tube 123. The coupling arms are held apart from each other by a spacer sleeve 133 which is rotatable about the coupling tube 123 with respect to the arms 124, 125. Similarly, the coupling arms 126 and 127 are arranged between locating strips 134 and 135, which are rigidly secured to the coupling tube 123, and a spacer sleeve 136 is disposed between the arms 126 and 127. In the carrying strips 131, 132, 134 and 135 is arranged a coupling mechanism in the form of a control rod 137, which is journalled in openings 161 in such carrying strips and is slidable lengthwise in these openings. The control rod 137 is parallel to the coupling tube 123 and its center-line 169 is at a distance 138 from the common center-line 168 of the coupling tube 123 and the carrying spindle 120. The control rod 137 is pivotally coupled to an adjusting arm 139 by a pivotal shaft 140. The adjusting arm 139 is pivotally coupled by a further pivotal shaft 141 to the coupling tube 123 (FIG. 12). The coupling tube 123 is provided with a fixing strip 142 provided with a locking pin 143, which can be inserted at will into any one of at least three holes 144 in the control rod 137. The control rod 137 can thus be put into any one of three positions and locked in those positions against axial movement with respect to the tube 123. The control rod 137 has four slots 145, 146, 147 and 148. These slots are located near and are adapted to cooperate with the ends 119 of the coupling arms 124, 125, 126 and 127.

The coupling tube 123 is supported approximately at its middle by a supporting strip 149, which is fastened to the strip 14. Near its middle the coupling tube 123 has fastened to it an adjusting lever 150, which is coupled by a pivotal shaft 151 with an inner cable 152 passing through an outer cable 153, one end of which is held stationary near the front of the hopper by a supporting tongue 154. Near the support 122 the coupling tube 123 is provided with an adjusting arm 155, which is movable between a guide plate 156 fastened to the support 122 and a guide bracket 157. The guide members 156 and 157 have holes 158 into which a pin 159 can be inserted to serve as an adjustable stop for the arm 155. The top end 160 of the bracket 157 constitutes a fixed terminal stop for the arm 155.

The coupling arms 124 and 125 extend beyond the axis 168 of the coupling tube 123 on the side opposite the pivotal shafts 128 for a distance 165, which is substantially equal to the distance 138. The ends 119 of the arms 124 to 127 have round cavities 166, the radius of which is slightly larger than the outer diameter of the round rod 137. The arms 124 to 127 can be brought into positions in which the cavities 166 are centered on the centerline 169 of the control rod 137.

To put the spreader into operation it is hitched to the lifting device of a tractor or a similar prime mover by means of the fastening strips 7 and 8. The stub shaft 9 is coupled by an auxiliary shaft to the power take-off shaft of the tractor. During operation the distribution members 5 and 6 can be caused to rotate from the power take-off shaft in opposite senses in a manner such that the adjacent sides of the distribution members 5 and 6 move in the travel direction 22, that is to say, towards the front of the spreader. The hopper 2 is filled with the material to be spread. From the hopper 2 the material can be fed to the distribution members 5 and 6 through the outlet ports 50 and 51 and the corresponding outlet ports 108 and 109. The locations of the ports 50, 51 and 108, 109 around the rotary axes 21 of the distribution members 5 and 6 with respect to the travel direction 22, the diameter 167 of the distribution members and their shape and speed of rotation are chosen so that the material is spread by each of the distribution members during travel over a strip of land covering approximately equal distances to both sides of the plane of symmetry 20. Thus in operation each strip receiving the material is covered twice i.e. once by the distribution member 5 and once by the distribution member 6. Owing to the symmetrical positions of the distribution members 5 and 6 and the symmetrical locations of the outlet ports 50 and 51 and 108, 109 with respect to the plane 20 the material is spread symmetrically with respect to that plane by the distribution members. Since the two distribution members spread the material symmetrically on the same strip of land a very uniform distribution pattern is obtained. To achieve the full benefit of this symmetrical arrangement, the material should flow in a regular stream through the outlet ports to the distribution members concerned.

It is to achieve this end that the outlet ports of each hopper part 3 and 4 are provided in a spherical wall portion 12 and 13 respectively, which acts as a delivery basin. The shape of the delivery basin has been selected so that its ends extend over a fairly large horizontal distance parallel to the horizontal floor 37 (when the spreader stands on a horizontal surface). The outlet ports 50 and 51 are situated in the more horizontal lower region of the wall portion 12. The lower sides of the outlet ports are located near the edge 28, which adjoins the floor 37 rotating with the distribution member 5. The combination of the floor 37 rotating about the axis 21 with the adjoining, spherical wall portion 12 has a particularly advantageous effect in obtaining a satisfactory passage of the material through the delivery basin. Thus the material can effectively and uniformly flow out through the outlet ports without tending to remain lying on the bottom or to stick to the wall portion 12. The rotating floor 37 imparts a centrifugal force to the material lying on it so that the material is pushed towards the spherical wall portion 12. The spherical wall guides the material received from the rotating floor in a manner such that it can readily flow towards the outlet ports 50 and 51, through which it flows. Since the outlet ports are provided in the more horizontal part of the delivery basin, it flows at an acute angle in the direction towards the distribution members, which can thus advantageously capture the material and pass it to their peripheries. The satisfactory flow of the material in the lower region of the hopper has a particularly useful effect on the passage of the material through the hopper parts 3 and 4. In this way disturbance of the stream of material in the hopper parts 3 and 4 and their delivery spouts 10 and 11 is avoided. Owing to the spherical design of the wall portions 12 and 13 corners in the lower ends of the hopper are eliminated so that sticking of the material is avoided.

In order to enable the quantity of material to be spread per unit surface to be controlled, the outlet ports 50 and 51 and 108, 109 can be closed to a greater or lesser extent by the dosing slides 80, 91 and 106, 107 respectively. For this purpose the dosing slides 80 and 81 move in front of the ports 50 and 51, the location of the pivotal shafts 84 and 85 being such that the dosing slides move in a substantially vertical direction along the outlet ports. Therefore, for effectively closing the outlet ports or parts thereof the width 90 of the dosing slides need not appreciably exceed the width 74 of the ports. In the closed state of the outlet ports the dosing slides 80 and 81 are in their lowermost positions as is shown in FIG. 3. The slides can be moved upwards out of this position to open the outlet ports to a greater or lesser extent. The location of the lower edges 91 of the dosing slides and of the portions 66 and 67 of, for example, the port 50 are such that at point 78 (FIG. 4) where the sides 66 and 67 meet, the edge 91 starts opening the port. Thus when the outlet port 50 starts to open it will not form a long, narrow opening, but a passage having a reasonable width and length so that through the small passage a small flow rate of material can occur for spreading a small amount per unit of surface on the strip of land concerned. Owing to the substantially vertical movement of the dosing slide 80 the edge 91 will move upwardly substantially parallel to itself so that a satisfactory shape of the released size of the port 50 is obtained as the dosing slide moves. What is described with reference to the port 50 also applies to the outlet port 51 with the dosing slide 81 and to the outlet ports 108 and 109 with the dosing slides 106 and 107.

A satisfactory contact between the dosing slides and the wall portion concerned around the circumferences of the outlet ports is obtained by resiliently pressing the dosing slides against the walls 12 and 13 respectively by means of the resilient carrying arms, for example, the carrying arms 82 and 83. Consequently no unwanted gaps are formed between the dosing slides and the edges of the outlet ports. The size of the passage of the ports can thus be accurately set so that the flowrate of material flowing out can be precisely controlled.

The dosing slide can be readily displaced by means of the adjusting mechanism 114. The dosing slides can be moved up and down by moving the coupling rods 95 and 96 and 112, 113 respectively. The coupling rods can be moved up and down by turning the coupling arms 124 to 127 about the spindle 120. For this purpose the coupling tube 123 can turn about the carrying spindle 120. The coupling tube 123 can be turned by the adjusting arm 150 and the Bowden cable constituted by the inner and outer cables 152, 153. The inner cable 152 can be actuated remotely, for example from the tractor seat, to turn the coupling tube 123. The arms 124, 125 are able to turn about the coupling tube 123 so that for turning these coupling arms with the coupling tube the coupling arms have to be locked to the coupling tube. This is the function of the control rod 137 connected to the coupling tube. The cavities 166 at the ends 119 of the coupling arms can be selectively engaged with the periphery of the control rod 137 as is shown in FIGS. 10 and 11. When the coupling tube 123 is turned, the control rod 137 also turns about the centerline 168 of the coupling tube 123. If the cavities 166 are engaged with the periphery of the control rod 137, the coupling arms are carried along by the control rod 137 as the coupling tube 123 turns about the carrying spindle 120. Turning of the coupling tube 123 thus brings about turning of the adjusting arms 124 to 127. This causes the dosing slides to be operated through the coupling rods.

Figure 2:
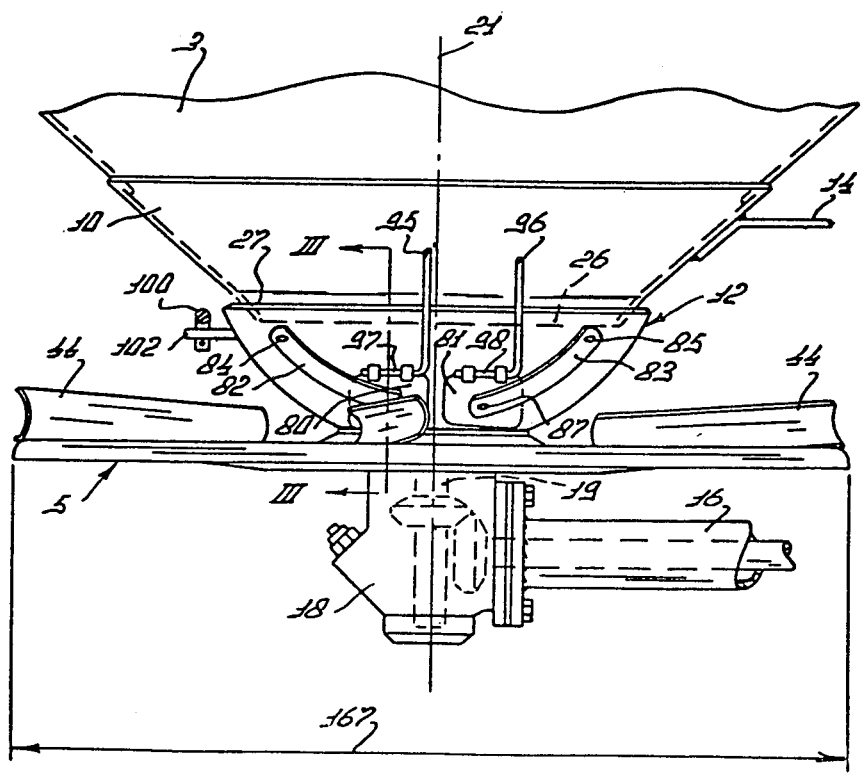
FIG. 2 is an enlarged front view of part of the spreader of FIG. 1.
Figure 7:
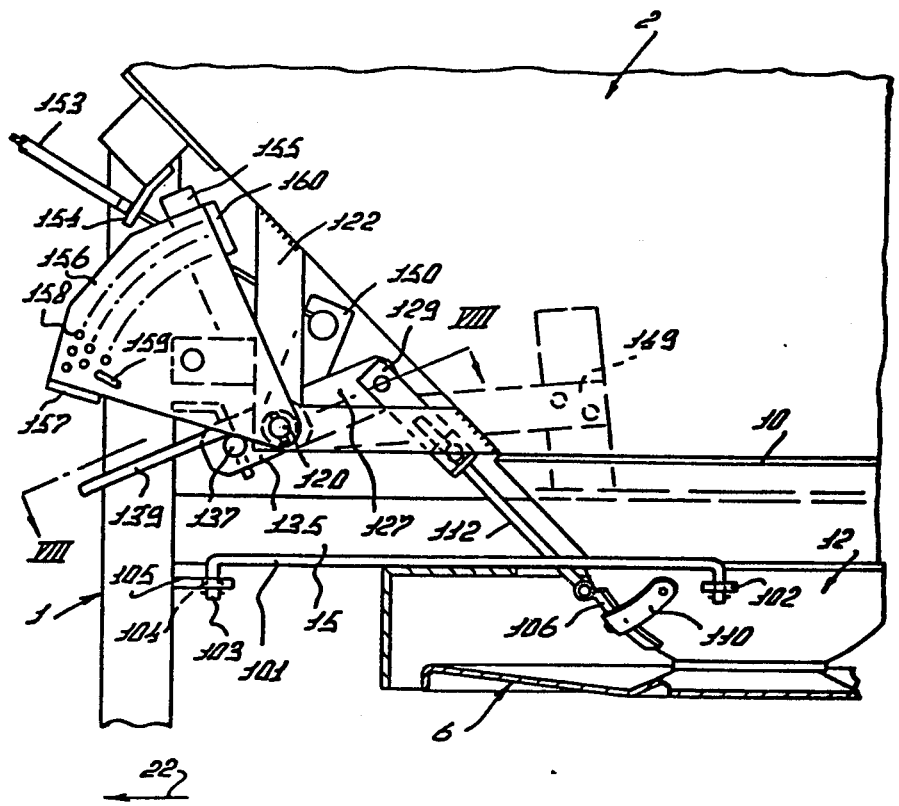
FIG. 7 is a side elevational view in partial section of the adjusting mechanism illustrated in FIG. 6.

In the position shown in FIG. 2 and in FIGS. 7 and 8 the dosing slides are closed. To open the dosing slides the coupling tube 123 is turned in the direction of the arrow 170 (FIG. 10) by operating the cable 152. This turn is also executed by the coupling arms 124 to 127 because of the engagement of the control rod 137 with the cavities 166. Consequently, the dosing slides move upwards to open the outlet ports. The adjusting arm 155 will turn out of its zero position, in which it contacts the stop 160, into a position determined by the pin 159. In the illustrated position of the pin 159, i.e. in the lowermost hole 158, the outlet ports are fully opened. When the pin 159 is inserted into a higher hole 158, the maximum stroke of the adjusting arm 155 and hence the angular turn of the coupling tube 123 about the centerline 168 are both limited. The slides can then not be moved upwards far enough to open the ports completely. Thus the location of the adjustable stop 159 can be used as an indication of the free aperture of the ports. By turning the coupling tube 123 in a direction opposite the arrow 170 the dosing slides can be closed again. With the aid of the fixed stop 160 and the adjustable stop formed by the pin 159 the dosing slides can be readily moved between a zero position and a selected open position by means of the remote control cable 152.

The location of the lower edges 91 and the outlet ports 50 and 51 are arranged that, even when only a small area of the outlet ports is open, the material is supplied over a sufficiently large part of the angle 77 to the distribution members so that the material can be ejected from a desired length of the periphery of the distribution member. This circumferential angle will not become significantly larger owing to the location and shape of the ports when the free aperture of the ports is enlarged. The circumferential angle determined by the length of the periphery over which material is ejected also determines the width of the strip of land over which each distribution member deposits the material. To ensure a consistent spreading width, the width of this strip must not be influenced by variation in the size of the outlet ports left open by the slides. However, the size of the circumferential angle over which the material leaves the distribution member can be adjusted by keeping one of the outlet ports completely closed. When this is done, the angle over which the material is fed to the distribution member is effectively halved. The result of this is that the circumferential angle over which the material leaves the distribution member is also halved, as is the width of the strip of land over which the material is deposited during travel of the spreader. When the material is spread by both outlet ports to each distribution member the material is spread by that distribution member to both sides of the plane of symmetry 20 over equal distances, and so closure of one of the ports will mean that substantially half of the spreading width of the material is cut off. By selecting the port to be closed it is possible to determine which part of the strip will not receive material. With the direction of rotation shown of the distribution member 5 the material will be mainly spread only on the right-hand side of the plane 20 with respect to the direction 22 when the outlet port 50 is closed and the material is fed only through the port 51 to the distribution member. Conversely, when the outlet port 50 is open and the port 51 is closed the material will mainly be spread only on the left-hand side of the plane of symmetry 20. In a similar manner by closing one of the outlet ports 108 and 109 the distribution member 6 will spread the material only on half the strip. By suitably selecting the ports to be closed, it is possible to spread material on only one side of the plane 20. For example, the outlet ports 50 and 109 can be kept closed so that the distribution members 5 and 6 both spread the material only on the right-hand side of the plane 20 with respect to the direction 22. Thus half a strip is covered by the two distribution members so that a uniform spread on this half of the strip is ensured. Conversely the material may be spread only on the left-hand side of the plane of symmetry 20 by opening the outlet ports 50 and 109 and by keeping the outlet ports 51 and 108 closed. In order to keep the two outlet ports closed by means of the adjusting mechanism 114 the dosing slides of the ports concerned have to remain in a position in which the ports are closed, whereas the dosing slides of the other ports can still be moved to open a greater or smaller area of these outlet ports. For this purpose the control rod 137 is provided. By displacing the control rod 137 two of the slots 145, 146, 147 and 148 can optionally be brought into alignment with two of the coupling arms 124 to 127. Alignment of a coupling arm with a slot disengages the control-rod from the coupling arm. This disengagement rotationally disconnects the coupling arm from the coupling tube 123 so that the dosing slide concerned is no longer actuated by the cable 152 forming a control member. In the position shown in FIGS. 8 and 10, all of the coupling arms are in engagement with the control rod. Movement of the control rod 137 to the right brings the slots 146 and 148 into alignment with the coupling arms 125 and 127 so that the engagement between these coupling arms and the control rod is interrupted. When the coupling tube 123 is turned out of the position shown in FIG. 10 in the direction 170, the slots 146 and 148 move with the control rod 137 along the ends of the coupling arms 125 and 127 so that only the coupling arms 124 and 126 are turned about the centerline 168 to displace the dosing slides 80 and 107. The dosing slides 81 and 106 will then keep the outlet ports 51 and 108 in the closed state because the coupling arms 125 and 127 remain in the position shown in FIGS. 10 and 11, whereas the coupling arms 124 and 126 turn with the coupling shaft in a position shown in FIG. 11. By displacing the control rod 137 in its lengthwise direction so that the slots 145 and 147 are aligned with the arms 124 and 126, the cavities 166 of the coupling arms 125 and 127 then engage the control rod 137 to lock the coupling arms to the control rod, the dosing slides 80 and 107 then remaining in the position in which the ports 50 and 109 are closed, whereas the dosing slides 81 and 106 can be moved up and down in front of the other ports for regulating the supply of the material.

To displace the control rod 137, the locking pin 143 must be removed from one of the holes 144. Subsequent operation of the arm 139 causes the control rod to be displaced so that the desired slots are aligned with the desired coupling arms. The rod 137 is locked in its new selected position by inserting the lock pin 143 into a different hole 144. The control rod 137 is thus movable lengthwise with respect to the coupling tube 123 and it is always turnable with the coupling tube 123 about the carrying shaft 120. The control rod 137 thus constitutes a releasable coupling mechanism for connecting and disconnecting the desired dosing slides to and from the adjusting mechanism 114. In this manner, simple adjustment is obtained, the control of which is easy, while the desired coupling of the dosing slides with the adjusting mechanism can be readily established for spreading the material over the full width or only on the left or on the right.

Although in the illustrated embodiment the spherical wall portions 12 and 13 are provided on a spreader having two distribution members, a single spherical wall portion with one or more outlet ports may be employed in a spreader having only one distribution member. Furthermore, although in the illustrated embodiment two outlet ports are provided in each spherical wall portion, a different number of ports, or only one outlet port, may be provided.

A satisfactory junction of the spherical delivery basin with the rotating floor 37 is obtained by the construction in which the spherical wall portion bears on the rotating floor. An advantageous construction be obtained by the proportioning given for the basins 12 and 13, which have a maximum diameter 35 of about thirty centimeters, while the floor 37 has a diameter of about thirteen centimeters. The height 32 of each delivery basin is then about nine centimeters. The diameter 167 of the distribution members can then be advantageously selected to ensure optimum spread of the material. The inclined position of the outlet ports with respect to the plane of the distribution members, which is determined by the spherical wall, results in such a direction of flow of material towards the distribution members that the distribution members can readily capture the material and transport it towards their peripheries. This ensures a uniform spread, whereas unwanted sticking of material on the various parts is avoided.

Although in this embodiment the adjusting mechanism shown cooperates through four coupling arms with four dosing slides, while by means of the control rod, two of the dosing slides at a time can be disconnected from the mechanism, the adjusting mechanism of the kind described above may also be used with a different number of dosing slides. In the same manner as described above the control rod will then be provided with the necessary slots to carry out the desired coupling and decoupling between the dosing slides and the control rod. The control rod of this embodiment may be provided with more slots than is indicated so that a different combination of dosing slides can be connected to and disconnected from the adjusting mechanism. The displaceability of the control rod 137 can be adapted so that the desired combinations can be established for connecting or disconnecting the coupling arms to or from the coupling tube or the dosing slides to or from the adjusting mechanism. The adjusting mechanism shown may also be used in a spreader having only one distribution member with one delivery member, and wherein two or more dosing slides with two or more ports are provided. Although in the embodiment described a spherical delivery basin is represented as a delivery member, in which all points of the wall portion, apart from the thickness of the wall portion, are equally spaced apart from the center of the sphere, it will be appreciated that the adjusting mechanism shown may also be employed with differently shaped delivery members of a hopper with appropriately arranged outlet ports and dosing slides. The dosing slides may, for example, be horizontally movable below a horizontal floor having one or more outlet ports. The coupling shaft and the control rod may have a different location than the horizontal position shown in the illustrated embodiment.

Although the adjusting arm 139 is represented as a directly manually operated arm, it may be remotely controllable, for example by hydraulic mechanism or a Bowden cable structure. For this purpose the support 122 may be provided with an arm to fasten the outer cable of the Bowden cable structure or a hydraulic ram.

Although various features of the spreader dscribed and illustrated are set forth in the following claims as inventive features, the invention is not necessarily limited to these features and may encompass all patentable novel features both individually and in various combinations.

Having disclosed our invention, what we claim as new and to be secured by Letters Patent of the United States is:

1. A device for spreading granular and/or powdery material comprising a hopper having at least two outlet ports, a rotatable distribution member arranged under said ports for receiving said material therefrom, each said port having a dosing slide for selectively closing it to a greater or lesser extent, said dosing slides being movable independently of each other by an adjusting mechanism comprising a control member, a coupling mechanism being provided which is operable selectively to connect and disconnect one or both said dosing slides to and from said control member so that one of said slides can remain in a predetermined position while the other said slide is displaceable by said adjusting mechanism, said adjusting mechanism comprising a coupling member on which coupling arms connected with said dosing slides are rotatably mounted, each said coupling arm extending to a position adjacent said coupling mechanism which is adjustable with respect to said coupling member and which together with said coupling member is rotatable about the centerline of said coupling member, said coupling mechanism being operable selectively to connect said coupling arms through said coupling mechanism rotationally with said coupling member to turn about said centerline, said coupling mechanism comprising a control rod extending parallel to said coupling member, said control rod being provided with slots which can be moved into and out of alignment with said coupling arms to connect and disconnect said coupling arms to and from said coupling member.

2. A device as claimed in claim 1, wherein said control rod is adjustable in its lengthwise direction with respect to said coupling member and can be selectively fixed in any one of at least two positions with respect to said coupling member.

3. A device as claimed in claim 2, wherein said control rod is slidable in supporting strips which are rigidly fastened to said coupling member.

4. A device as claimed in claim 2, wherein said control rod is coupled with an adjusting arm which is rotatably arranged on said coupling member.

5. A device as claimed in claim 2, wherein said control rod is movable relatively to a tongue which is rigidly mounted on said coupling member so that said control rod is fixable in any one of at least two positions by means of a locking member cooperating with said tongue.

6. A device as claimed in claim 1, wherein said control rod has a plurality of slots corresponding to the number of said coupling arms arranged on said coupling member, and each of said coupling arms is coupled to a respective said dosing slide.

* * * * *